US012588984B2

(12) United States Patent     (10) Patent No.:   US 12,588,984 B2

Weir                      (45) Date of Patent:     Mar. 31, 2026

(54) DENTAL APPARATUS AND METHODS

(71) Applicant: Charles Douglas Weir, Mitchell, IN (US)

(72) Inventor: Charles Douglas Weir, Mitchell, IN (US)

( * ) Notice: Subject to any disclaimer, the term of this patent is extended or adjusted under 35 U.S.C. 154(b) by 216 days.

(21) Appl. No.: 18/216,945

(22) Filed: Jun. 30, 2023

(65) Prior Publication Data

US 2024/0000550 A1     Jan. 4, 2024

Related U.S. Application Data

(60) Provisional application No. 63/367,375, filed on Jun. 30, 2022.

(51) Int. Cl.
*A61C 8/00*         (2006.01)
*A61C 13/265*      (2006.01)

(52) U.S. Cl.
CPC ........ *A61C 8/0062* (2013.01); *A61C 13/2656* (2013.01)

(58) Field of Classification Search
CPC ..... A61C 8/0062; A61C 8/005; A61C 8/0048; A61C 13/2656

USPC ......................................................... 433/172
See application file for complete search history.

(56) References Cited

U.S. PATENT DOCUMENTS 9,033,709 B1   5/2015   Allen et al.
9,314,318 B2   4/2016   Mullaly et al.
9,452,030 B2   9/2016   Allen et al.

OTHER PUBLICATIONS

Hasegawa et al., Soln. for washing and disinfecting dental treatment tools contains chloro:amine(s) and chelating agents, JP-01165502-A, machine translation (Year: 1989).*
Zhang et al. , A depth measuring ruler for dentistry planting, CN-114288054-A, machine translation (Year: 2022).*
Baruc, An abutment and a dental measuring set, ES-2860928-T3, machine translation (Year: 2021).*

* cited by examiner

*Primary Examiner* — Eric J Rosen
*Assistant Examiner* — Mirayda A Aponte
(74) *Attorney, Agent, or Firm* — Buss & Benefield, PLLC; Michael A. Benefield; Brian Buss

(57)           ABSTRACT

Disclosed are methods and devices for measuring the wear on a dental implant abutment in order to identify the corresponding dental retention insert that is necessary to improve the fit and function of dentures and partial dentures with a patient.

7 Claims, 6 Drawing Sheets

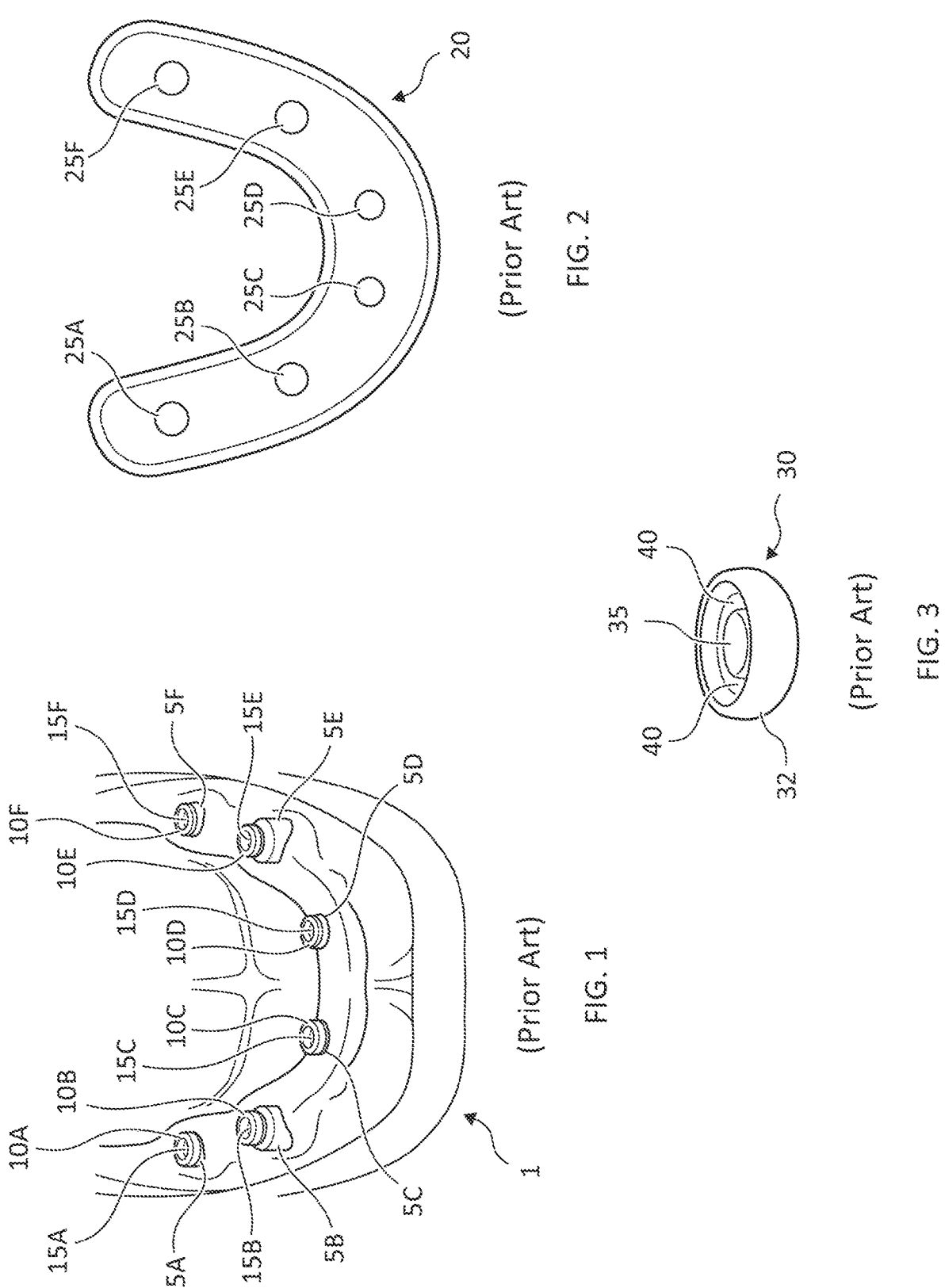
(Prior Art)
FIG. 2
(Prior Art)
FIG. 1
(Prior Art)
FIG. 3

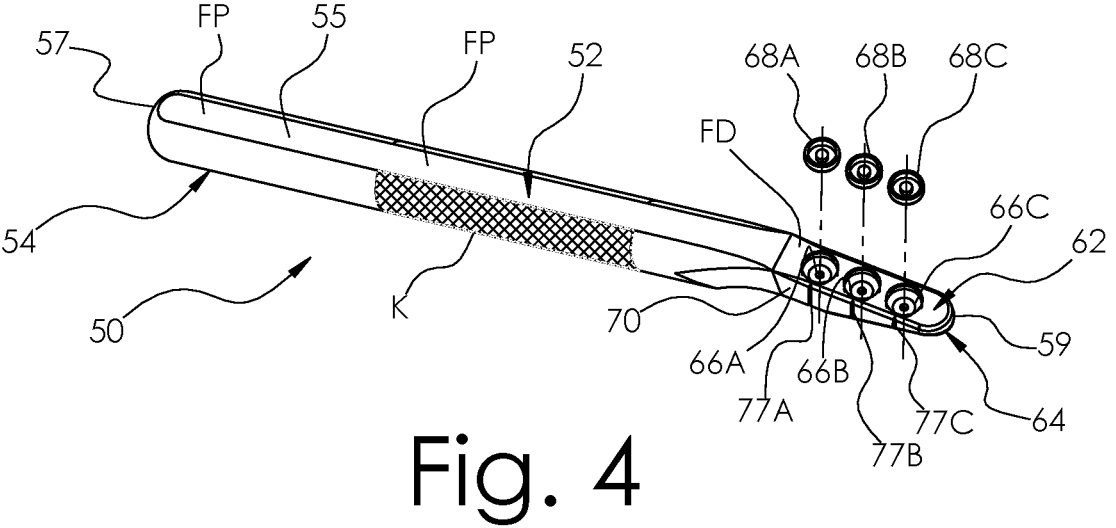
Fig. 4
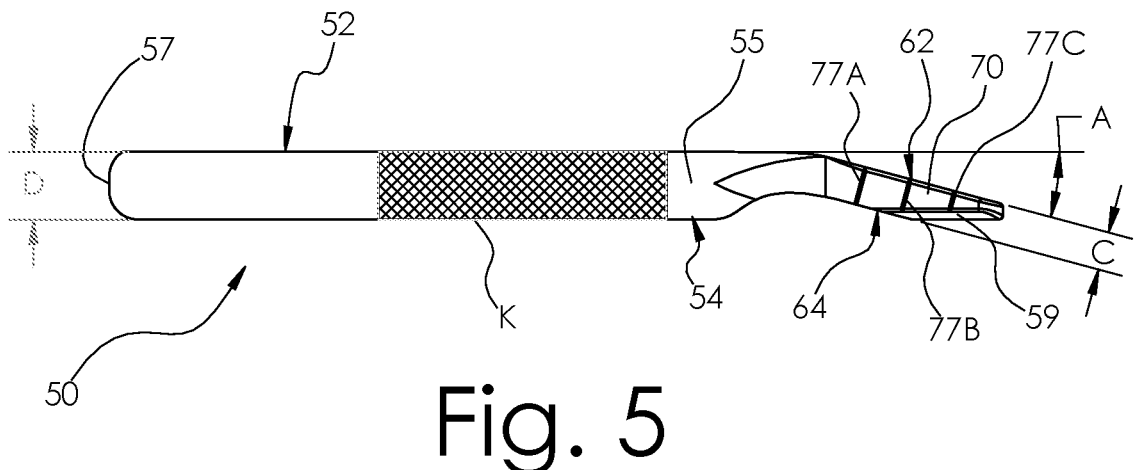
Fig. 5

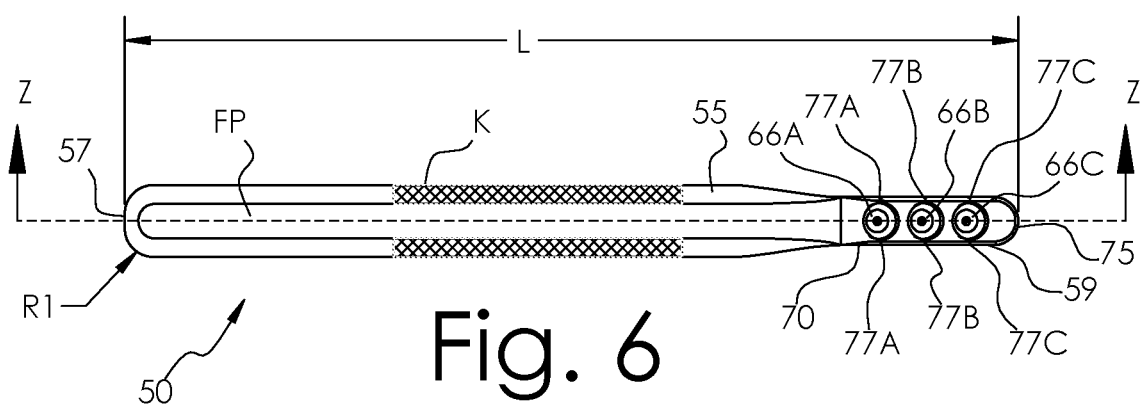
Fig. 6
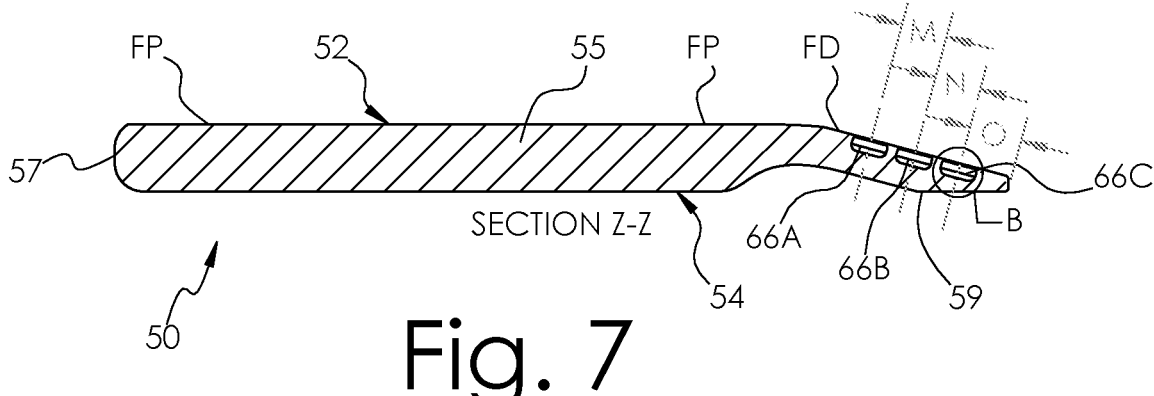
Fig. 7
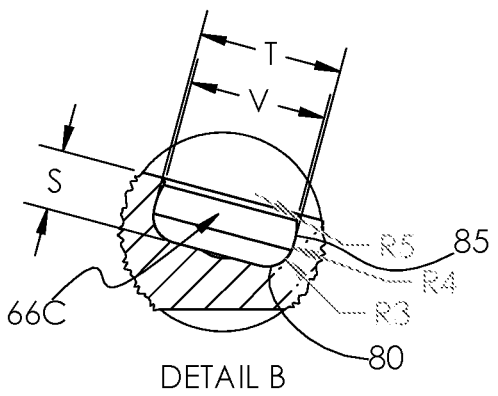
Fig. 8

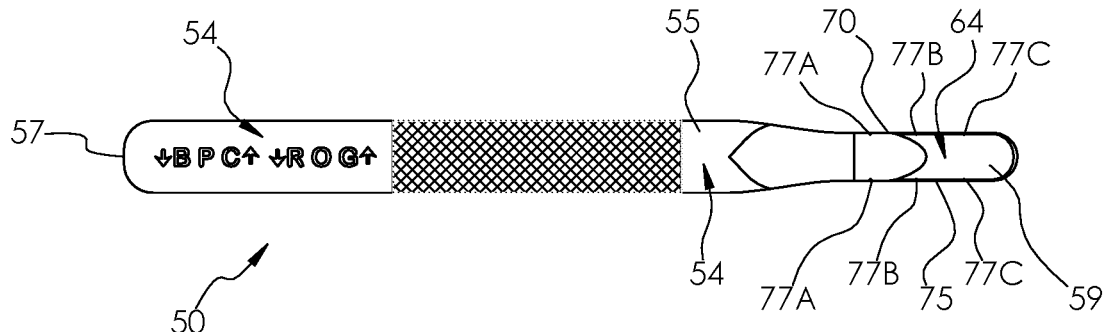
Fig. 9

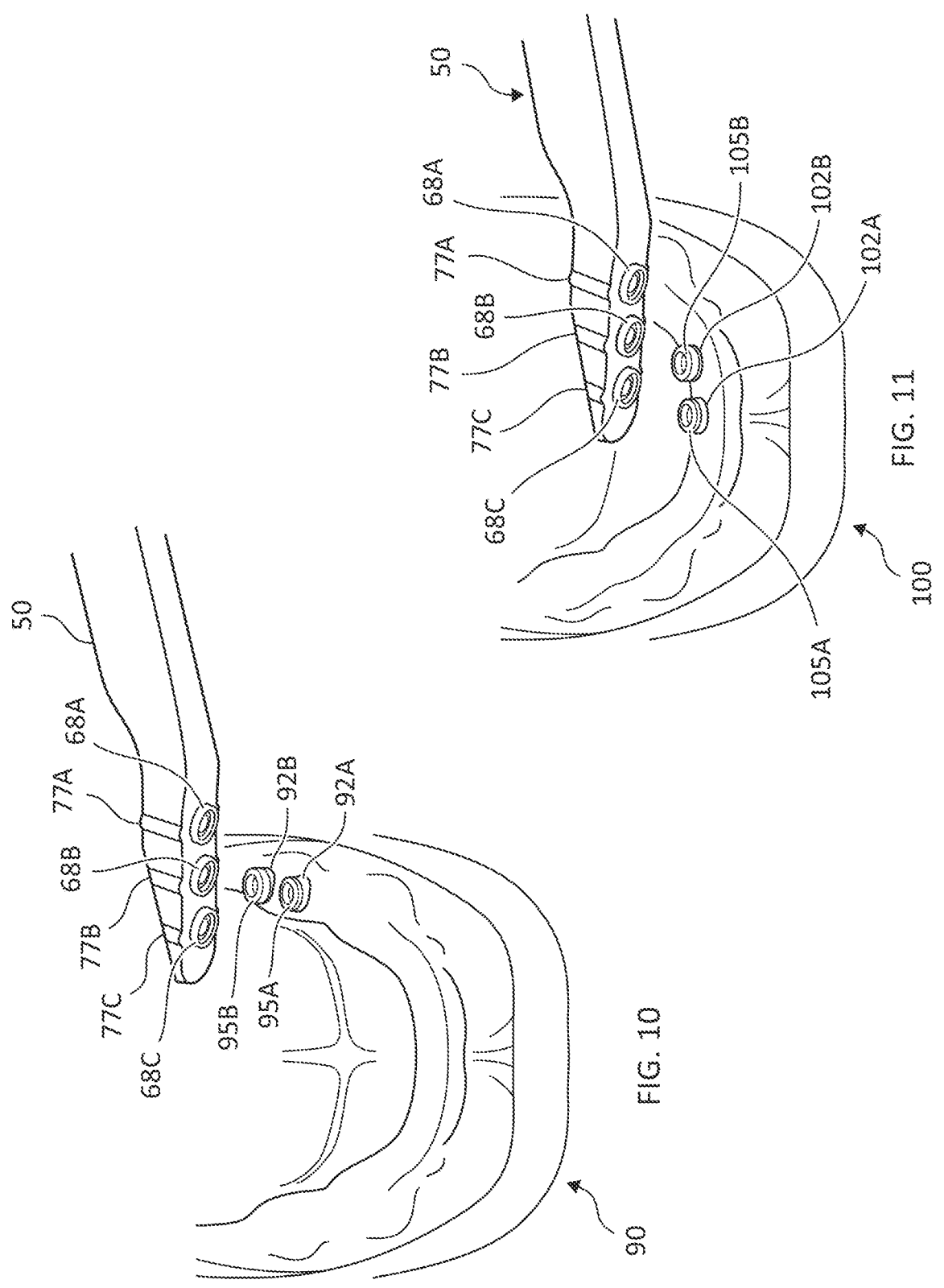
FIG. 10
FIG. 11

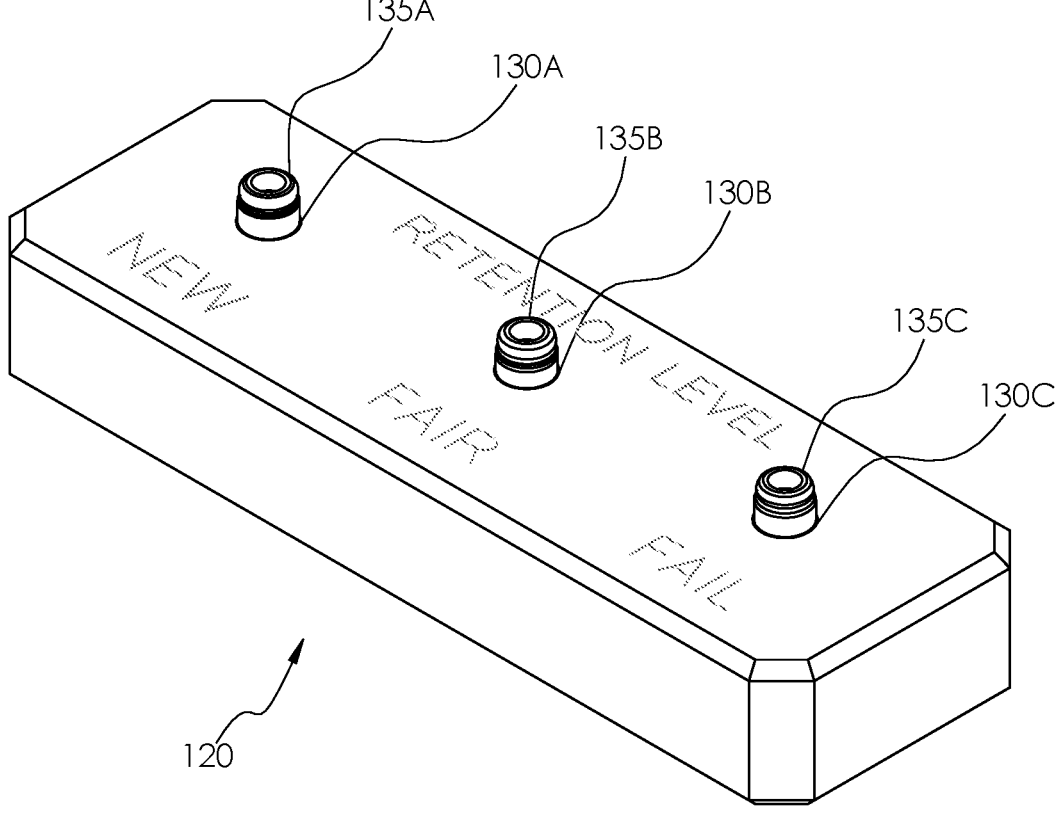
Fig. 12

DENTAL APPARATUS AND METHODS

CROSS-REFERENCE TO RELATED APPLICATIONS

This application claims the benefit of U.S. Provisional Patent Application Ser. No. 63/367,375, filed Jun. 30, 2022, which is hereby incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

The inventor has not made any public disclosure of the inventions prior to the priority date claimed herein.

BACKGROUND OF THE INVENTION

1. Field of the Invention

The inventions described herein relate to devices and methods for measuring the wear on an abutment that is used in snap connector retention system in order to improve the fit and function of dentures and partial dentures within a patient.

2. Description of Related Art

Implant retained dentures typically utilize a snap attachment system to retain a denture within a patient's mouth. As shown in FIG. 1, for example, a plurality of abutments 5A to 5F can be implanted at various locations within the jaw of a patient's mouth 1. These implants can be located in an endosseous implant within the patient's jaw. Typically, the abutment is made of materials, such as machined or polished titanium (such as gold colored titanium), gold colored anodized stainless steel, gold, PEEK (polyether ether ketone), zirconia, and the like, and the end that protrudes from the tissue includes a ring 10A to 10F. Each abutment 5A-5F typically includes a recess 15A-15F inside of the ring 10A-10F, and can be provided by Zest Dental Solutions®.

Turning now to FIG. 2, the snap attachment system can also include a denture 20 that includes a plurality of housings 25A to 25F that are secured within the denture 20 at a variety of locations 25A to 25F that match with the locations of the abutments 5A-5F implanted within the patient's mouth 1. Each housing 25A-25F can receive a retention insert 30, such as is depicted in FIG. 3. As shown in FIG. 3, each retention insert 30, which is typically made of a polymer such as nylon, includes an outer wall 32 that is configured to releasably fit within a housing 25A-25F. The retention insert can include a generally concave inside wall 40 and can optionally include a raised center portion 35 so as to create an annular recess within the retention insert.

When retention inserts 30 are placed in each housing 25A-25F, then the denture 20 can be releasably secured to each abutment 5A-5F when the retention insert 30 mates with each ring 10A-10F on each abutment 5A-5F. When a retention insert 30 is used that has a raised center portion 35, then the raised center portion 35 is located within the recess 15A-15F of the abutment 5A-5F.

The retention inserts 30 can be provided by Zest Dental Solutions®, and are typically provided with varying retention strengths, which is a measure of how tightly a particular retention insert 30 will affix to a corresponding abutment ring 10A-10F. Moreover, the retention inserts 30 are color coded by retention strength. In the dual retention system provided by Zest Dental Solutions®, the blue retention insert 30 has a low retention of 1.5 pounds, the pink retention insert 30 has a medium retention of 3.0 pounds, and the clear retention insert 30 has a high retention of 5.0 pounds. In the extended range system provided by Zest Dental Solutions®, the red retention insert 30 has a low retention of 0.5 to 1.5 pounds, the orange retention insert 30 has a medium retention of 2.0 pounds, and the green retention insert 30 has a high retention of 3 to 4 pounds.

The retention inserts 30 may wear during use of the denture 20, and the retention inserts 30 are easily exchanged using methods and devices known in the arts, such as by using an Locator Core Tool by Zest Dental Solutions®. The rings 10A-10F are typically more resistant to wear than the retention inserts 30 but may still degrade over time. This degradation in the abutments rings 10A-10F, as shown by rings 10D-10F in FIG. 2, can be difficult to discern by vision alone. The wear appearance can be deceiving and is often in obscure patterns, hidden by reflective glare, and that may involve only a portion of the abutment ring 10D-10F circumference.

Wear in the abutment rings 10A-10F is not typically equal in nature because wear can be caused by a variety of unique factors that may be directed at only a specific number of the abutment rings 10D-10F. These factors include habits, such as one-sided chewing, or when natural lower teeth contact the rings 10D-10F located in in the patient's upper jaw when the patient sleeps without the denture 20 in place, or when patients chew food without the denture 20 in place, or when patients use oil-based abrasive toothpaste that becomes trapped in the interfaces between the abutment rings 10D-10F and the corresponding retention insert 30 thereby slowly removing the metal structure of the abutment rings 10D-10F over time during chewing force vertical motions, or by excessive divergent angles (tilted) of the implanted abutments that abrade the sides of the abutments rings as the denture 20 is inserted and removed.

Indicators of wear in retention inserts 30 or abutment rings 10A-10F include tactile indicators, audible indicators, and patient sensation. With respect to tactile indicators, the patient and/or clinician can feel the relative ease or resistance with seating and detaching the housings 25A-25F (that include retention inserts 30) at each abutment ring 10A-10F. With respect to audible indicators, the patient and/or clinician can listen to the sound of the "click" upon seating and detaching the housings 25A-25F (that include retention inserts 30) at the abutment rings 10A-10F. A crisp "click" is an indicator that the retention inserts 30 and abutment rings 10A-10F are like new. A mild, dull click is an indicator that some retention inserts 30 or abutment rings 10A-10F are worn. When there is no click, then the wear is excessive on either some retention inserts 30 and/or some abutment rings 10A-10F. With respect to patient sensation, a patient can typically offer his or her sensations when seating and detaching the denture 20 from the abutment rings 10A-10F and communicate these sensations to the clinician.

After wear occurs in a retention insert(s) or the abutment rings 10D-10F, patients typically find that detaching one side of the denture 20 is easier than the opposite side of the denture 20 when placing and removing the denture 20 from their mouth because as stated above, such wear is typically uneven. Removal of the denture 20 in this manner can create side-to-side and/or front to back tipping of the denture 20 when one area breaks loose first. Removing or inserting the tipped appliance then promotes scraping and abrasion of the abutment rings 10A-10F as they grind against one other when angled. This results in accelerated degradation of the abutment rings 10A-10F and retention inserts 30 and more frequent maintenance appointments for the patient. In some cases, the patients simply struggle along until the performance is severely degraded, or something breaks.

Currently, when wear is suspected in an abutment ring 10D-10F or corresponding retention insert 30, the typical clinician approach involves asking the patient to describe the snap-in feeling they get when placing or removing the denture 20. If the patient states the denture 20 is not fitting like it did when new, or that the denture 20 detaches too easily, or that it doesn't stay in or pops off the abutments 5A-5F during chewing and/or speaking, then the clinician assumes the retention insert(s) 30 are worn or that an abutment ring 10D-10F is also worn.

The clinician then commences a series of trials that consist of removing and replacing retention inserts 30 within the housing 25A-25F with retention inserts 30 of higher retention value. For example, the clinician may replace a blue retention insert 30 (having a retention value of 1.5 pounds) with a pink retention insert 30 (which has a retention value of 3.0 pounds). These retention insert 30 replacements may be done in several of the housing locations 25D-25F of the denture 20, based on the clinician's view of where the worn abutment rings 10D-10F are located. Some clinicians believe that this trial-and-error approach is a hassle, and will therefore immediately swap out the retention insert(s) 30 with a retention insert(s) 30 of the highest retention value (such as a clear retention insert 30) and skip intermediate retention insert 30 levels (such as pink). This approach often causes excessive force to be used by the patient to place and remove the denture 20. This can cause damage to the denture 20, such as actual breakage of the denture 20, or patient may drop and damage the denture 20 given the amount of force necessary to remove the denture 20.

In any event, the above trial-and-error approach is difficult and time consuming. Given the number of variables (which abutment ring(s) 10A-10F may be worn and which retention insert(s) 30 is the best fit), it is difficult for a clinician to balance out the retention performance of each abutment ring 10A-10F and retention insert 30 pair.

Several of the techniques and devices described above are discussed in U.S. Pat. No. 9,314,318 (to Mullaly et al.), U.S. Pat. No. 9,033,709 (to Allen et al.), and/or U.S. Pat. No. 9,452,030 (to Allen et al.), each of which is hereby incorporated herein by reference in its entirety.

In view of the background in this area, there remain needs for improved and/or alternative devices and methods for measuring the wear on an abutment that in order to improve the fit and function of dentures and partial dentures within a patient.

BRIEF SUMMARY OF THE INVENTION

In one aspect, the invention provides an apparatus for determining wear on a dental abutment. The apparatus includes an elongate body that has a proximal end and a distal end. The distal end of the elongate body further includes at least one aperture, where each aperture is configured to releasably receive a dental retention insert.

In another aspect, the invention provides an apparatus for determining wear on a dental abutment that includes an elongate body that has a proximal end and a distal end. The proximal end of the elongate body includes a top portion and a bottom portion, and the distal end of the elongate body includes a top portion and a bottom portion. The top portion of the proximal end of the elongate body includes a flat section configured to prevent the apparatus from rolling when placed on a dental tray. The top portion of the distal end of the elongate body includes a flat section that further includes at least one aperture that is configured to releasably receive a dental retention insert. The apparatus is configured to provide an angle that is defined by a plane that occupies the flat section of the top portion of the distal end and a reference plane projected distally from the flat section of the proximal end of the elongate body, where the angle falls within a range of from about 0 degrees to about 45 degrees.

In yet another aspect, the invention provides a kit that includes an apparatus for determining wear on a dental abutment. The apparatus includes an elongate body that has a proximal end and a distal end. The distal end of the elongate body further includes at least one aperture, each of which is configured to releasably receive a dental retention insert. The kit also includes at least one dental retention insert configured for placement within the at least one aperture provided by the apparatus.

BRIEF DESCRIPTION OF THE SEVERAL VIEWS OF THE DRAWINGS

FIG. 1 depicts an upper perspective view of a patient's mouth with implanted abutments.

FIG. 2 depicts a top view of a patient's denture.

FIG. 3 depicts an upper perspective view of a retention insert.

FIG. 4 depicts an upper perspective view of an illustrative embodiment of the invention.

FIG. 5 depicts a side elevation view of an illustrative embodiment of the invention.

FIG. 6 depicts a top view of an illustrative embodiment of the invention.

FIG. 7 depicts a cross sectional view of an illustrative embodiment of the invention taken along line Z-Z in FIG. 6.

FIG. 8 depicts a zoomed in view of section B depicted in FIG. 7.

FIG. 9 depicts a bottom view of an illustrative embodiment of the invention.

FIG. 10 depicts an upper perspective view of a patient's mouth with implanted abutments.

FIG. 11 depicts an upper perspective view of a patient's mouth with implanted abutments.

FIG. 12 depicts an upper right perspective view of an illustrative embodiment of the invention.

DETAILED DESCRIPTION OF THE INVENTION

For the purposes of promoting an understanding of the principles of the invention, reference will now be made to certain embodiments thereof and specific language will be used to describe the same. It will nevertheless be understood that no limitation of the scope of the invention is thereby intended, such alterations, further modifications and further applications of the principles of the invention as described herein being contemplated as would normally occur to one skilled in the art to which the invention relates.

FIGS. 4-9 depict an illustrative embodiment of an apparatus for determining wear on a dental abutment (depicted in FIG. 11 as 102A, 102B). As depicted, the apparatus 50 can include an elongate body 55 that has a proximal end 57 and a distal end 59. With specific reference to FIGS. 4, 5 and 9, the proximal end 57 of the elongate body 55 can include a top portion 52 and a bottom portion 54, and the distal end 59 of the elongate body 55 can similarly include a top portion 62 and a bottom portion 64.

Turning now to FIGS. 4 and 7, the top portion 52 of the proximal end 57 of the elongate body 55 can include a flat section FP that is configured to prevent the apparatus 50 from rolling when placed on a dental tray (not depicted). The top portion 62 of the distal end 59 of the elongate body 55 can also include a flat section FD that can include three apertures 66A, 66B, 66C, each of which is configured to releasably receive a dental retention insert 68A, 68B, 68C, such as those provided by Zest Dental Solutions®.

As shown in FIG. 5, the elongate body 55 of the apparatus 50 can be configured to provide an angle A that is defined by a plane that occupies the flat section FD of the top portion 62 of the distal end 59 of the elongate body 55 and a reference plane that projects distally from the flat section FP of the proximal end 57 of the elongate body 55. In certain embodiments, the angle A can fall within a range of about 0 degrees to about 60 degrees. Alternatively, such angle A can fall within a range of about 5 degrees to about 45 degrees, or in other embodiments, such angle A can fall within a range of about 10 degrees to about 25 degrees, or such angle can be about 15 degrees. Any suitable angle configuration is acceptable, however, and such angle helps a clinician better locate and move the apparatus 50 within the mouth of a patient to evaluate wear on dental abutments.

Returning to FIG. 4, the dental retention inserts 68A, 68B, 68C are shown in a removed position above the apertures 66A, 66B, 66C that are located in the distal end 59 of the elongate boy 55. The retention inserts 68A, 68B, 68C can be provided by Zest Dental Solutions®, and are typically provided with varying retention strengths, which is a measure of how tightly a particular retention insert 68A, 68B, 68C will affix to a corresponding abutment ring as shown in FIGS. 10 (95A, 95B) and 11 (105A, 105B). The retention inserts 68A, 68B, 68C are color coded by retention strength. In the dual retention system provided by Zest Dental Solutions®, the blue retention insert 68A, 68B, 68C has a low retention of 1.5 pounds, the pink retention insert 68A, 68B, 68C has a medium retention of 3.0 pounds, and the clear retention insert 68A, 68B, 68C has a high retention of 5.0 pounds. In the extended range system provided by Zest Dental Solutions®, the red retention insert 68A, 68B, 68C has a low retention of 0.5 to 1.5 pounds, the orange retention insert 68A, 68B, 68C has a medium retention of 2.0 pounds, and the green retention insert 68A, 68B, 68C has a high retention of 3 to 4 pounds. The retention inserts 68A, 68B, 68C can be easily placed into and removed from each aperture 66A, 66B, 66C using methods and devices known in the art, such as by using a Locator Core Tool by Zest Dental Solutions®.

Returning again to FIG. 4 in certain illustrative embodiments, the proximal end 57 of the elongate body 55 can occupy a generally cylindrical shape, a portion of which can include knurling K, which will help a clinician maintain control of the apparatus 50. Illustrative such knurling can include raised diamond shape protrusions that project outwardly from the elongate body 55 or can include any other effect or added material to help improve a clinician's grip over the apparatus 50, including but not limited to bumps, grooves, scribed lines, laser etching, painted lines, or and/or adhesives. As depicted in FIG. 6, the knurling K need not extend over the flat section FP of the proximal end 57 of the elongate body 55. Although the flat section FP of the proximal end 57 of the elongate body 55 can help to stabilize the device on a dental tray, in certain embodiments, such flat section FP need not be present. In alternative embodiments, as well, instead of a generally cylindrical shape, the proximal end 57 of the elongate body 55 can occupy any suitable shape, such as trapezoidal, cuboid, cylindrical, such as with a diameter of 0.375 inches, and the like. Similarly the distal end 59 of the elongate body 55 need not include a flat section FD. In alternative embodiments, the distal end 59 of the elongate body 55 can include any suitable shape, such as trapezoidal, cuboid, cylindrical, and the like. In such alternative embodiments, consideration should be made to permit ready placement of the retention inserts 68A, 68B, 66C (while disposed in the apertures 66A, 66B, 66C) onto abutments in a patient's mouth.

As depicted in FIG. 5, the proximal end 57 of the elongate body 55 can include a thickness D that extends from the flat section FP of the proximal end to the bottom portion 54 of the elongate body 55. Such thickness can include any suitable thickness, such as from about 0.200 inches to about 0.500 inches. In certain embodiments, such thickness D can be about 0.35 inches, such as 0.353 inches. As also depicted in FIG. 5, the distal end 59 of the elongate body 55 can include a portion that is defined by a thickness C that extends between the flat section FD of the distal end 62 to the bottom portion 64 of the distal end 59 of the elongate body. Such thickness can include any suitable thickness, such as from about 0.100 inches to about 0.300 inches. In certain embodiments, such thickness D can be about 0.200 inches. As is also shown in FIG. 5, the bottom portion 64 of the distal end 59 of the elongate body 55 can taper starting at about the vertical centerline of aperture 66B by reducing the thickness C of the distal end 59 of the elongate body 55 when moving in a distal direction toward the distal most location of the elongate body 55. Such taper can be desirable because it can help improve the mobility of the distal end 59 of the elongate body 55 within a patient's mouth, especially in hard to reach areas of the mouth, such as the back of the mouth, near the throat.

Turning now to FIG. 6, the distal end 59 of the elongate body 55 can include a first side 70 and a second side 75. Illustratively, the apertures 66A, 66B, 66C can reside between the first side 70 and the second side 75 of the distal end 59 of the elongate body 55. In certain embodiments, the first side 70 and the second side 75 can include identifiers 77A, 77B, 77C that are configured to illustrate the approximate vertical center line of the apertures 66A, 66B, 66C and the retention inserts 68A, 68B, 68C. In certain embodiments, each identifier 77A, 77B, 77C can include a recessed line that extends inwardly from the first side 70 and the second side 75 of the distal end 59, each of which 77A, 77B, 77C also extends from the top section FD of the distal end 59 to the bottom portion 64 of the distal end 59 along the vertical centerline of each aperture 66A, 66B, 66C and retention insert (when installed) 68A, 68B, 68C. Each such indicator 77A, 77B, 77C can illustratively occupy a width of 15 thousandths of an inch and a height of 10 thousandths of an inch, but in other embodiments any suitable dimension can be used. The indicators 77A, 77B, 77C can provide tactile and/or visual indicators of the vertical center line of the retention inserts 68A, 68B, 68C to facilitate a clinician's ability to place a particular retention insert 68A, 68B, 68C on a particular abutment. Although the depicted indicators 77A, 77B, 77C are recessed lines within both the first side 70 and the second side 75, in alternative embodiments, the indicators 77A, 77B, 77C can occupy any suitable form to provide the desired ability to place the retention inserts 68A, 68B, 68C over abutments in a patient's mouth. In certain embodiments, for example, the indicators 77A, 77B, 77C can include protrusions that extend outwardly from either or both the first side 70 and second side 75 and that extend from the top section FD of the distal end 59 to the bottom portion 64 of the distal end 59 of the elongate body 55 (see, for example FIGS. 10 and 11). In yet other embodiments, the indicators 77A, 77B, 77C can include one or more bumps or dots, such as recessed dots, or grooves, or one or more markers, such as can be painted onto the elongate body 55, to help visualize the location of the vertical centerlines of the retention inserts 68A, 68B, 68C. Yet additionally, such indicators 77A, 77B, 77C, such as recessed lines, which can be etched, scribed, or formed into the elongate body 55, can also include paint or the like to help a clinician visualize the location of each such indicator 77A, 77B, 77C.

As also shown in FIG. 6, the elongate body 55 of the apparatus 50 can have an overall length L, that can include any suitable dimension, such as from about 3 inches or less to about 7 inches or more. In certain embodiments, such overall length L can fall within the range of from about 3.5 inches to about 5 inches, such as 4.65 inches. As is also shown in FIG. 6, the proximal end 57 of the elongate body 55 can be rounded with a corner radius of 0.15 inches.

Turning now to FIG. 7, the apertures 66A, 66B, 66C can be placed in the distal end 59 of the elongate body 55 with their aperture openings located in the flat section FD of the distal end 59 of the elongate body 55. Illustratively, such apertures 66A, 66B, 66C can be placed a distance of M, N from one another, with such distances M, N measured from the vertical center line of each aperture 66A, 66B, 66C. In certain embodiments, such distance M from the centerline of the proximal most aperture 66A to the centerline of the middle aperture 66B can be 0.240 inches and the distance N from the centerline of the middle aperture 66B to the centerline of the most distal aperture 66C can be 0.241 inches. Moreover, the centerline of the distal most aperture 66C and be located a distance O from the distal most location of the elongate body. Such distance O can illustratively be 0.280 inches. In alternative embodiments, however, these dimensions M, N, O can be varied, such as to provide for more or less space between the apertures 66A, 66B, 66C. In other embodiments, as well, the distal end 59 of the elongate body 55 can include as few as a single aperture 66A or only include two apertures 66A, 66B. In yet other embodiments, the distal end 59 of the elongate body 55 can include more than three apertures, such as four, five, six, or more apertures, such as when it is desirable to include more retention inserts within an illustrative apparatus 50 of the invention. In certain embodiments, the apertures can be disposed to open in both the flat section FD of the distal end

59 of the elongate body 55, as well as the bottom portion 64 of the elongate body 55, such as to provide an apparatus 50 that includes multiple apertures (and therefore retention inserts) but is still short enough for a clinician to readily move in a patient's mouth to gauge wear on abutments therein.

Turning now to FIG. 8, an illustrative aperture 66C taken as a partial detail view of FIG. 7 is depicted. As shown, the aperture 66C can extend a distance S from the top section FD of the distal end 59 to the bottom 80 of the aperture 66C. Illustratively, this distance S can be 0.78 inches. The aperture 66C can include a wall 85 that is defined by three curvatures when the wall extends from the bottom 80 of the aperture 66C to the opening of the aperture 66C at the flat section FD. The first radius R3 can be 0.035 inches and the second radius R4 can be 0.090 inches. Both the first radius R3 and the second radius R4 form an aperture 66C wall 85 that is inwardly concave toward the vertical centerline of the aperture. Just prior to the intersection of the aperture 66C wall 88 and the flat section FD of the distal end 59, a third radius R5 turns the aperture 66C wall 85 slightly convex so as to better provide for the insertion of a retention insert 68C within the aperture 66C. In certain embodiments, the third radius R5 is 0.007. This radius R5 provides a convex opening that begins with a diameter V, which can be 0.1786 inches, and ends with a diameter of T, which can be 0.1875 inches. In alternative embodiments, the aforementioned dimensions S, R3, R4, R5, V, and T can be varied so as to provide for a retention insert 68A, 68B, 68C to be releasably secured within each aperture 66A, 66B, 66C. At times, these dimensions (S, R3, R4, R5, V, and T) may need to be varied to accommodate a retention insert 68A, 68B, 68C of a provider other than Zest Dental Solutions®.

Although such apertures 66A, 66B, 66C can be configured to releasably receive a retention insert 68A, 68B, 68C, such as those provided by Zest Dental Solutions®, in alternative embodiments, such apertures 66A, 66B, 66C can be configured to releasably received a retention insert 68A, 68B, 68C that is configured as a spring that can gauge the force necessary to remove the spring driven retention insert 68A, 68B, 68C from an abutment ring so as to determine the amount of wear on the abutment ring. Illustratively, such spring driven retention inserts 68A, 68B, 68C can be placed in each aperture 66A, 66B, 66C or alternatively a single spring driven retention insert 68A can be placed in a single aperture 66A where such spring driven retention insert 68A is capable of determining various levels of wear on an abutment ring. Such force can be measured by the force needed to remove the apparatus 50 from the abutment ring or alternately such force measurement can be provided on the apparatus 50, such as by using a force transducer to measure and report the force necessary to remove the spring driven retention insert 68A from the abutment ring. Illustrative such force indications can include no wear, moderate wear, or excessive wear (which an indication that the abutment needs to be replaced). Although such spring retention insert 68A, 68B, 68C can be releasably disposed in such apertures 68A, 68B, 68C, in alternative embodiments such retention inserts 68A, 68B, 68C can be fixed within such apparatus 50 as part of the manufacturing process.

Returning now to FIG. 9, in certain embodiments, the bottom portion 54 of the proximal end 57 of the elongate body 55 can include a key to remind a clinician of how to place and then use retention inserts 68A, 68B, 68C. For example, the letter "B," "P," and "C" can be inscribed in a distal direction with a down arrow proximal to "B" and an up arrow distal to "C." This can remind a clinician that, when using a dual retention system provided by Zest Dental Solutions®, the blue retention insert 68A is located within the proximal most aperture 66A, a pink retention insert 68B is located in the middle aperture 66B, and a clear retention insert 68C is located in the distal most aperture 66C. The arrows remind a clinician that the blue retention insert 66A provides the least amount of retention force and the clear retention insert 68C provides the most retention force in a dual retention system provided by Zest Dental Solutions®. Distal to the aforementioned key can be inscribed a "R," "O," and "G," with the "R" in the most proximal location. A down arrow can be located proximally to the "R" and an up arrow can be located distally to the "G". This can remind a clinician that, when using the extended range system provided by Zest Dental Solutions®, the red retention insert 68A is located in the first aperture 66A, an orange retention insert 68B is located in the second aperture 66B, and a green retention insert 68C is located in the distal most aperture 66C, and that such retention inserts progress from the least amount of retention force (with red) to the most amount of retention force (green). In embodiments where the apparatus 50 includes only three apertures, then a clinician will need to swap out the retention inserts 68A, 68B, 68C when switching from the dual retention system to the extended range system and vice versa, unless the clinician utilizes two apparatuses 50, one configured for use with the dual retention system and other configured for use with the extended range system.

In certain embodiments, the apparatus 50 can be made using any suitable manufacturing technique. For example, the apparatus 50 can be milled from a casting or a block of metal using suitable milling techniques, so as to provide an apparatus 50 with a unitary elongate body 55. Illustrative such materials of construction can include stainless steel, such as 316 stainless steel, aluminum, steel and the like. In other embodiments, the apparatus 50 can be printed using a 3D printer. In yet other embodiments, it may be desirable to provide an apparatus 50 that can be sterilized using certain sterilization techniques and in such embodiments, the apparatus 50 can be provided with suitable materials and manufacture to accomplish those sterilization goals.

In yet other embodiments, the apparatus 50 can be provided as part of a kit with one or more retention inserts 68A, 68B, 68C. If desirable, such kits can be provided in sterilized or sanitized form so that the components are ready for use.

Turning now to FIG. 10, depicted is the lower jaw of a patient's mouth 90 that includes two abutments 92A, 92B, each of which has two rings 95A, 95B. As shown, ring 92A has greater wear than ring 95B. A clinician can use the apparatus 50 in the matter depicted (with his or her hand) to determine the wear on each ring by successively mating each retention insert 68A, 68B, 68C in the apparatus 50 with each ring 95A, 95B until the clinician can determine which retention insert 68A, 68B, 68C best fits the ring 95A, 95B. When making this determination, the clinician can use the indicators 77A, 77B, 77C to help align the retention insert 68A, 68B, 68C with the ring 95A, 95B. Patient feedback can help a clinician when making the intra-oral wear determination. For example, the patient can feel the relative lack of click and grip of worn abutments, and the better retention of a less worn abutment. Patients typically understand the need to replace worn parts (abutments and retention inserts), and are grateful to avoid replacing abutments and inserts that are still useful.

Once the proper retention insert 68A, 68B, 68C is determined for the abutment 92A, 92B, then the clinician can install new retention inserts that correspond with such determination within the denture of the patient to provide for a better fit of the denture in the patient's mouth 90. As depicted in FIG. 10, the location of the abutments 92A, 92B are in the back of the patient's mouth and are therefore in a location that is difficult to assess wear by a clinician. The apparatus 50 removes guess work from the wear determination by giving the clinician a mechanical means of determining wear and eliminate the need to visually determine wear on the rings 95A, 95B or use a trial-and-error approach by replacing the retention inserts in the denture with various retention levels and placing and removing the denture to determine fit.

Turning now to FIG. 11, the mouth 100 of a patient is shown with two abutments 102A, 102B, each of which has a ring 105A, 105B. As shown, the wear on ring 105A is greater than the wear on ring 105B. Even though the abutments 102A, 102B are located close to one another, the apparatus is still able to mate with each ring 105A, 105B to determine the amount of wear on each ring 105A, 105B so as to create a better fit between the denture and the abutments 102A, 102B. Although abutments are depicted in the lower jaw, the apparatus 50 can be used on abutments and rings located in the upper jaw, as well.

Turning now to FIG. 12, a training device 120 is depicted. The training device 120 can include abutments 130A, 130B, 130C with rings of various wear 135A, 135B, 135C. A clinician can use the apparatus 50 to practice on the training device 120 to help the clinician assess the differing levels of wear that he or she may encounter on abutments that are implanted in a patient's mouth. As shown, the rings 135A, 135B, 135C can start with a new ring 135A having no wear, then migrate to a ring 135B having moderate wear that can be overcome by using a retention insert of higher retention level, and then migrate to a ring 135C that has too much wear to overcome with a retention insert having a higher retention level. Instead, the abutment 130C would need to be replaced if present in a patient's mouth. Although the depicted training device 120 includes three abutments 130A, 130B, 130C, in other embodiments, it can include more (or fewer) abutments in order to provide more examples of the types of wear that can be encountered in a patient's mouth so as to permit the clinician to train with the apparatus 50. In addition to the training of clinicians, the training device 120 can be used to quickly train dental assistants and dental hygienists to skillfully utilize the apparatus 50.

All publications cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. An apparatus for determining wear on a dental abutment, comprising:
   an elongate body, said elongate body having a proximal end and a distal end;
   wherein said proximal end of said elongate body includes a top portion and a bottom portion;
   wherein said distal end of said elongate body includes a top portion and a bottom portion;

wherein said top portion of said proximal end of said elongate body includes a flat section configured to prevent said apparatus from rolling when placed on a dental tray;

wherein said top portion of said distal end of said elongate body includes a flat section that further includes at least one aperture configured to releasably receive a dental retention insert;

wherein said apparatus is configured to provide an angle that is defined by a plane that occupies said flat section of said top portion of said distal end and a reference plane projected distally from said flat section of said proximal end of said elongate body; and wherein said angle falls within a range of from 5 degrees to 25 degrees.

2. The apparatus of claim 1, wherein said angle is 15 degrees.

3. The apparatus of claim 2, wherein said at least one aperture further includes two apertures, each of said two apertures configured to releasably receive said dental retention insert.

4. The apparatus of claim 2, wherein said at least one aperture further includes three apertures, each of said three apertures configured to releasably receive said dental retention insert.

5. An apparatus for determining wear on a dental abutment, comprising:

an elongate body, said elongate body having a proximal end and a distal end;

wherein said proximal end of said elongate body includes a top portion and a bottom portion;

wherein said distal end of said elongate body includes a top portion and a bottom portion;

wherein said top portion of said proximal end of said elongate body includes a flat section configured to prevent said apparatus from rolling when placed on a dental tray;

wherein said top portion of said distal end of said elongate body includes a flat section that further includes at least one aperture configured to releasably receive a dental retention insert;

wherein said apparatus is configured to provide an angle that is defined by a plane that occupies said flat section of said top portion of said distal end and a reference plane projected distally from said flat section of said proximal end of said elongate body;

wherein said angle falls within a range of from about 0 degrees to about 45 degrees;

wherein said elongate body includes 316 stainless steel;

wherein a portion of said proximal end of said elongate body occupies a cylindrical shape; and wherein a portion of said cylindrical elongate body includes knurling.

6. The apparatus of claim 5, wherein said angle falls within a range of from 5 degrees to 25 degrees.

7. The apparatus of claim 6, wherein said angle is 15 degrees.

* * * * *